(12) United States Patent
White et al.

(10) Patent No.: US 8,837,487 B2
(45) Date of Patent: Sep. 16, 2014

(54) CASCADED MEMORY TABLES FOR SEARCHING

(75) Inventors: Martin White, Sunnyvale, CA (US); David Melman, Hakerem (IL); Tal Mizrahi, Haifa (IL)

(73) Assignee: Marvell World Trade Ltd. (BB)

( * ) Notice: Subject to any disclaimer, the term of this patent is extended or adjusted under 35 U.S.C. 154(b) by 56 days.

(21) Appl. No.: 13/570,785

(22) Filed: Aug. 9, 2012

(65) Prior Publication Data

US 2012/0300779 A1 Nov. 29, 2012

Related U.S. Application Data

(63) Continuation of application No. 12/485,076, filed on Jun. 16, 2009, now Pat. No. 8,243,733.

(60) Provisional application No. 61/074,001, filed on Jun. 19, 2008.

(51) Int. Cl.
*H04L 12/28* (2006.01)
*H04L 12/701* (2013.01)
*H04L 12/747* (2013.01)
*H04L 12/741* (2013.01)

(52) U.S. Cl.
CPC .............. *H04L 45/00* (2013.01); *H04L 45/742* (2013.01); *H04L 45/54* (2013.01)
USPC ....................................................... 370/392

(58) Field of Classification Search
None
See application file for complete search history.

(56) References Cited

U.S. PATENT DOCUMENTS

| | | | |
|---|---|---|---|
| 5,914,938 A | 6/1999 | Brady et al. | |
| 5,930,359 A | 7/1999 | Kempke et al. | |
| 6,490,279 B1 | 12/2002 | Chen et al. | |
| 6,711,161 B1 | 3/2004 | Erimli | |
| 6,721,319 B1 | 4/2004 | Amano et al. | |
| 7,680,978 B1 * | 3/2010 | Narayan et al. | 711/108 |
| 2003/0118035 A1 | 6/2003 | Sharma et al. | |
| 2004/0131068 A1 | 7/2004 | Korber et al. | |
| 2005/0047411 A1 | 3/2005 | Kadambi et al. | |
| 2006/0059196 A1 | 3/2006 | Sato et al. | |
| 2008/0052487 A1 * | 2/2008 | Akahane et al. | 711/207 |

FOREIGN PATENT DOCUMENTS

| | | |
|---|---|---|
| EP | 0 716 556 A2 | 6/1996 |
| EP | 1 128 611 A2 | 8/2001 |

OTHER PUBLICATIONS

PCT International Search Report and Written Opinion from PCT International Application No. PCT/US2009/047431, PCT International Filing Date Jun. 16, 2009; having a Date of Mailing of Aug. 28, 2009.

(Continued)

*Primary Examiner* — Minh-Trang Nguyen

(57) ABSTRACT

Devices, systems, methods, and other embodiments associated with cascaded memory tables for searching are described. In one embodiment, an integrated chip is implemented with two or more address tables. The two or more address tables are implemented with separate memory tables to store addresses. The two or more address tables are comprised of a first address table and a second address table. Connection lines connect the first address table and the second address table to create a cascaded address table. Search logic initiates a search of the first address table for an address. If the address is not found, the search logic initiates a search of the second address table through the connection lines.

20 Claims, 8 Drawing Sheets

(56) References Cited

OTHER PUBLICATIONS

Ghose, K., et al: "Response Pipelined CAM Chips: The First Generation and Beyond," Proceedings of the International Conference on VLSI Design, XX, XX, Jan. 5, 1994, pp. 365-368, XP002049055.

Moors, T., et al: "Cascading Content Addressable Memories," IEEE Micro, IEEE Service Center, Los Alamitos, CA US, vol. 12, No. 3, Jun. 1, 1992, pp. 56-66, XP000277663.

* cited by examiner

CASCADED MEMORY TABLES FOR SEARCHING

CROSS REFERENCE TO RELATED APPLICATIONS

This disclosure is a continuation of U.S. Ser. No. 12/485,076 filed Jun. 16, 2009; now U.S. Pat. No. 8,243,733, which claims the benefit of U.S. provisional application Ser. No. 61/074,001, filed on Jun. 19, 2008, which are hereby wholly incorporated by reference.

BACKGROUND

Electronic devices can communicate to each other through a network. One way to communicate in the network is by sending packets of information. Typically, a packet contains a packet header and a payload of data. The payload of data is information that is being communicated between two electronic devices. The header has information that is used to forward the packet from a sending device to a receiving/destination device.

For a packet to reach a distant electronic device in a large network, the packet will cross different network links. The network links are terminated at switches as well as other networking devices. A switch interfaces with the network through many ports that correspond to network links and other network devices. When the switch receives a packet on a port, the switch then routes the packet to another port to continue transmission along another link. Eventually, the packet will reach the receiving/destination device if no errors occur. The switch routes the packet based on a source address, a destination address, or other addresses in the packet header. The source address is the address of the electronic device that sent the packet and the destination address is the electronic device that is to receive the packet.

In one example, a switch may be connected to 100 ports. Over time, the switch will compile information in an address table to store a best port for routing a packet based on the destination address of the packet. For example, suppose that the switch assigns a port value of 24 to packets with a destination address of 1000. This assignment (along referred to as mapping) is set in the address table. Later, when the address of 1000 is received by the switch, the switch will search the address table and find that the port value of 24 is assigned to address 1000. The switch will route the packet to port 24 so that the packet will advance toward the destination device.

Sometimes the switch receives a packet with an address that is not in the address table. In this case, the switch is not able determine where to route the packet. To determine a port for an address not in the address table, the switch may flood multiple ports with the packet. The switch will flood multiple ports with the packet until the switch learns where a destination for the packet resides.

Flooding the ports with redundant messages impacts the throughput of the switch. Having to repeatedly process a redundant message to multiple ports interrupts the processing of received packets. To increase the odds of finding an address and avoiding flooding of the ports, relatively large address tables are designed into silicon chips. For example, a chip may contain four 32K address tables with each address table storing 32K addresses. Providing multiple address tables satisfies high forwarding rates that may require multiple copies of the same forwarding table.

New standards such as the Gigabit Passive Optical Networking (GPON) standard require increased numbers of switch ports that in turn require an address table with an increased size. The increases are required in order for a switch to provide adequate data throughput to satisfy the GPON standard. However, increasing the address table size above 32K entries impacts the cost of manufacturing a silicon chip. A better way to access memory may be desired.

SUMMARY

An example embodiment includes an integrated chip implemented with two or more address tables. The two or more address tables are implemented with separate memory tables to store addresses. The two or more address tables are comprised of a first address table and a second address table. Connection lines connect the first address table and the second address table to create a cascaded address table. Search logic initiates a search of the first address table for an address. If the address is not found, the search logic initiates a search of the second address table through the connection lines.

Another embodiment includes a semiconductor chip, comprised of memory blocks. The memory blocks are comprised of a plurality of tables that independently store network parameters. The plurality of tables are connected via at least one connection line in series to form a cascaded parameter table. The semiconductor chip further comprises search logic. The search logic receives a network parameter and searches the plurality of tables sequentially in series to find a matching parameter.

Another embodiment includes a method. The method decodes a network packet to determine a destination address. A first address table is searched for an address matching the destination address. If the matching address is not found, a signal is generated to initiate a search in a second address table that is serially connected to the first address table. The serially connected second address table is searched for an address matching the destination address. If the destination address is found, the network packet is transmitted to a destination port corresponding to the destination address.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
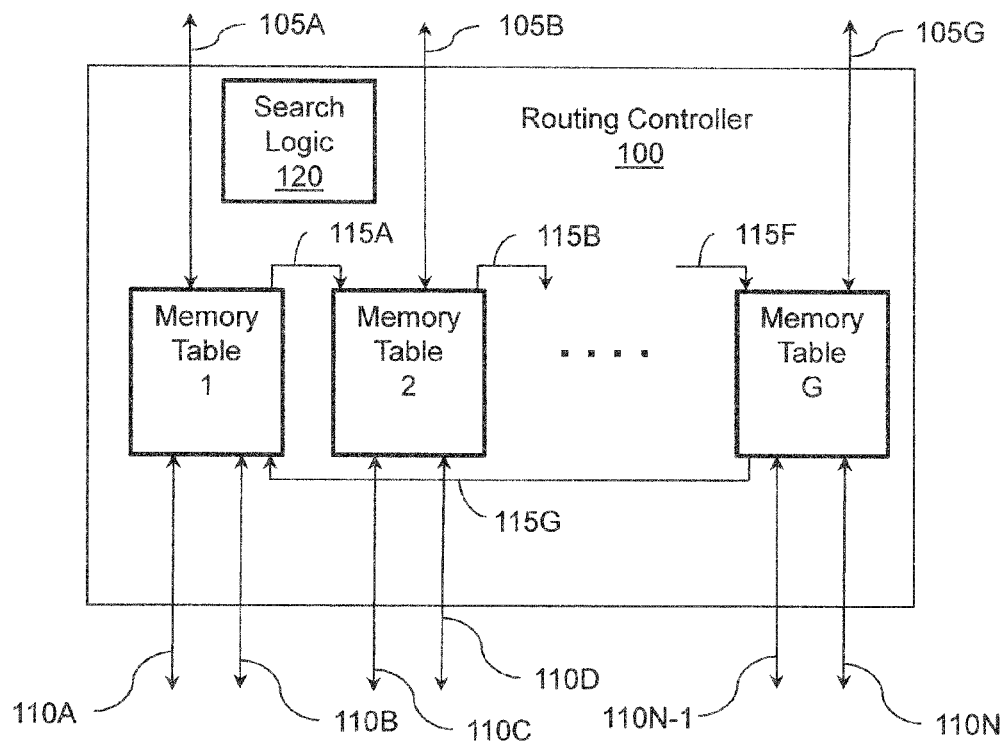
FIG. 1 illustrates an embodiment of a routing controller associated with cascaded memory tables for searching.

Described herein are example systems, methods, and other embodiments associated with cascaded memory tables. Memory tables that form the cascaded memory table generally operate independent of one another and are configured to be independently searched. However, when an address is not found in a memory table, the cascaded configuration allows a search to be forwarded to a next memory table. For example, in one configuration the tables may be searched for forwarding information, and in another configuration the memory tables may be searched based on, data values, filtering information, or policing information. Those of ordinary skill in the art will appreciate that the tables may be searched for other information.

In one embodiment, an apparatus is implemented with memory address tables that service different groups of ports. The address tables are implemented as separate memory tables that store addresses. Electrical connection lines connect the address tables to form a cascaded address table configuration. In one embodiment, the cascaded address table configuration provides a single homogenous database and the ability to perform cascaded address table searching even though the address tables operate independently. The apparatus comprises search logic configured to initiate cascaded searches and/or parallel searches of the address tables.

In one embodiment, when the apparatus receives an address, the apparatus searches for the address in one of the address tables. If the address is not found, the search is cascaded to the next address table that is connected via an electrical connection line. The next address table is then searched. The process of searching an address table and cascading the search when the address is not found is repeated until the address is found or the search is ended. Providing the capability to search more than one table increases the odds that an address will be found, and reduces the chance that request messages will be flooded to the network when an address is not found in the first table searched.

In one embodiment, the apparatus comprises a circuit configured to function as an interface between a high data rate uplink and lower data rate line cards. A line card is a device that provides an interface between electronic devices and a network. The apparatus functions to route packets between uplinks and line cards based at least in part on address routing tables.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media and/or volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Memory access", as used herein, includes but is not limited to writing, reading, matching, and/or programming a memory cell or a group of memory locations. Memory access may include dual reads to the same memory using two read ports. Memory access can include other types of interactions with memory as would be appreciated by those of ordinary skill in the art.

FIG. 1 illustrates one embodiment of a routing controller 100 that is configured to search memory tables for routing information. The routing controller 100 comprises two or more memory tables implemented with separate memory blocks (e.g. memory tables 1-G). The memory tables 1-G store addresses. Electrical connection lines 115 A-G connect the memory tables to create a cascaded address table configuration. The memory tables are connected so that one memory table is serially connected to one downstream table and to one upstream table. The serially connected memory tables 1-G form a cascaded chain of memory tables. In one embodiment, the chain may be closed. In another embodiment, the chain may be open with search information entering at the top of the chain. In this manner, the individual memory tables 1-G function as address databases configured to forward a search across a serial link. In one respect, the configuration can be regarded as a single homogenous database.

In one embodiment, the memory tables 1-G are independent network packet forwarding tables. However, cascading the individual memory tables 1-G provides the ability to forward network packets through one or more other memory tables 1-G that are connected through the serial links 115A-G. The forwarding of network packets through the cascaded memory table allows a single memory table to operate as if the memory table is extended in size (e.g. as large as the cascaded tables) and is still homogenous. A search request to the last memory table may include information indicating the last memory table is the last memory table to be searched. This information allows the last memory table to perform other specific tasks that are not performed by prior searched tables.

In one embodiment, the memory tables 1-G are configured to store addresses and routing information. The routing information is used by the routing controller 100 to route data between uplink lines 105A-G and downlink lines 110A-N. Network traffic/packets may be routed from one of the uplink lines 105A-G to one of the downlink lines 110A-N or vice versa.

In one embodiment, the routing controller 100 includes search logic 120. The search logic 120 controls searches within the memory tables 1-G. When a packet is received, the search logic 120 initiates a search in a corresponding memory table for an address of the packet. If the address is not found in the searched memory table, the search logic 120 is configured to initiate a search for the address in a serially connected memory table through an associated electrical connection line 115 A-G. In another embodiment, one memory is associated with and bound to one search controller. A search controller of one memory may not be aware of a previous or a subsequent search of another memory. Therefore, a search controller bound to one memory considers searches of the memory it is associated with to be the last search of a memory.

In one embodiment, address table 1 and address table 2 are pre-configured or configurable to create the cascaded address table. The cascaded address table may be configured by the routing controller 100 by switching electrical connection line 115A together to cascade address table 1 and address table 2. Alternatively, multiplexer control signals could be selected that dynamically create connections between tables and electrical connection lines 115A-G to form cascaded address tables from individual memory blocks.

In one embodiment, the memory tables 1-G are implemented with separate blocks of memory. In another embodiment, the memory tables 1-G may be memory arrays implemented with memory cells. The memory tables 1-G are configured to store one type of address such as a media access control (MAC) address. As discussed below, a packet may be routed to a destination that is based, at least in part, on a MAC address of the packet. In another embodiment, the packet may include parcels of information (e.g., descriptors) that cause devices that receive the packet to respond to the parcels of information.

In another embodiment, the memory tables 1-G are configured to store two or more types of addresses. For example, the memory tables 1-G can store a MAC address and an Internet protocol (IP) address. If a packet contains a destination address that is a MAC address the packet is routed based, at least in part on the MAC address. If the packet contains a destination address that is an IP address, the packet is routed based, at least in part on the IP address. In other embodiments, the memory tables 1-G may be configured to store layer two address, layer three address, and/or portions of these or other addresses.

The memory tables 1-G are configured to operate independent of one another. For example, the search logic 120 may initiate a search of one address in memory table 1 and search for a different address in a different memory table 2-G such as memory table 2. Memory tables 1 and 2 are searched in parallel independent of one another. However, when the search for an address of memory table 1 does not find the address, the search is cascaded to memory table 2 via the electrical connection line 115A. The search is re-initiated by the search logic 120 in memory table 2.

In one embodiment, the electrical connection lines 115 A-G electrically connect the memory tables 1-G in a circular ring topology. The search logic 120 in the routing controller 100 is configured to begin a search for an address at a selected memory table. If the address is not found, the search logic 120 continues the search to an adjacently connected memory table 1-G in the circular ring topology via a corresponding electrical connection line 115 A-G.

In one embodiment, the routing controller 100 is an integrated circuit that is an interface between the uplink lines 105 A-G and line cards connected to the downlink lines 110 A-N. In one embodiment, the data rate on the uplink lines 105 A-G is greater than the data rate on the line cards. The routing controller 100 is configured to route data between the uplink lines 105 A-G and the line cards based, at least in part, on a destination address associated with the address found by the search logic 120.

In one embodiment, memory table 1 is associated with and routes packets for a first group of line cards connected to the downlink lines 110 A-N. Memory table 2 is associated with and routes packets for a second group of line cards connected to different downlink lines 110 A-N. When a packet is received from an uplink line 105 A-G, the search logic 120 determines a destination address from the packet. The search logic 120 then initiates a search based, at least in part, on the destination address. The network packet is routed to one of the first group of line cards or one of the second group of line cards based, at least in part, on the routing results found from the memory table(s).

In one embodiment, the routing controller 100 is an integrated chip operating in a network switch. The chip may be made with silicon or other materials. In another embodiment, the chip is incorporated on a printed circuit board in a network switch. The network switch provides network connections with a network. The routing controller 100 may be implemented with two or more chips operating in homogonous collaboration. The two or more chips may distribute address tables to be searched among the two or more chips. The routing controller 100 may also be part of a system on a chip (SoC).

In another embodiment, the network switch is configured to flood address request messages to other devices connected to the network when the address is not found in any of the memory tables 1-G. This means that the switch does not know how to route the corresponding packet. Address request messages are messages that the routing controller 100 sends to ports, or a subset of ports, of the network switch asking for routing information for the address. The address request message can also be sent to other devices connected to the network switch. Eventually, a device will receive one of the address request messages and reply with routing information for the network packet. The network controller 100 will then store the routing information in one of the memory tables 1-G. As explained above, the cascaded memory table configuration is used to reduce the frequency of message flooding.

Figure 2:
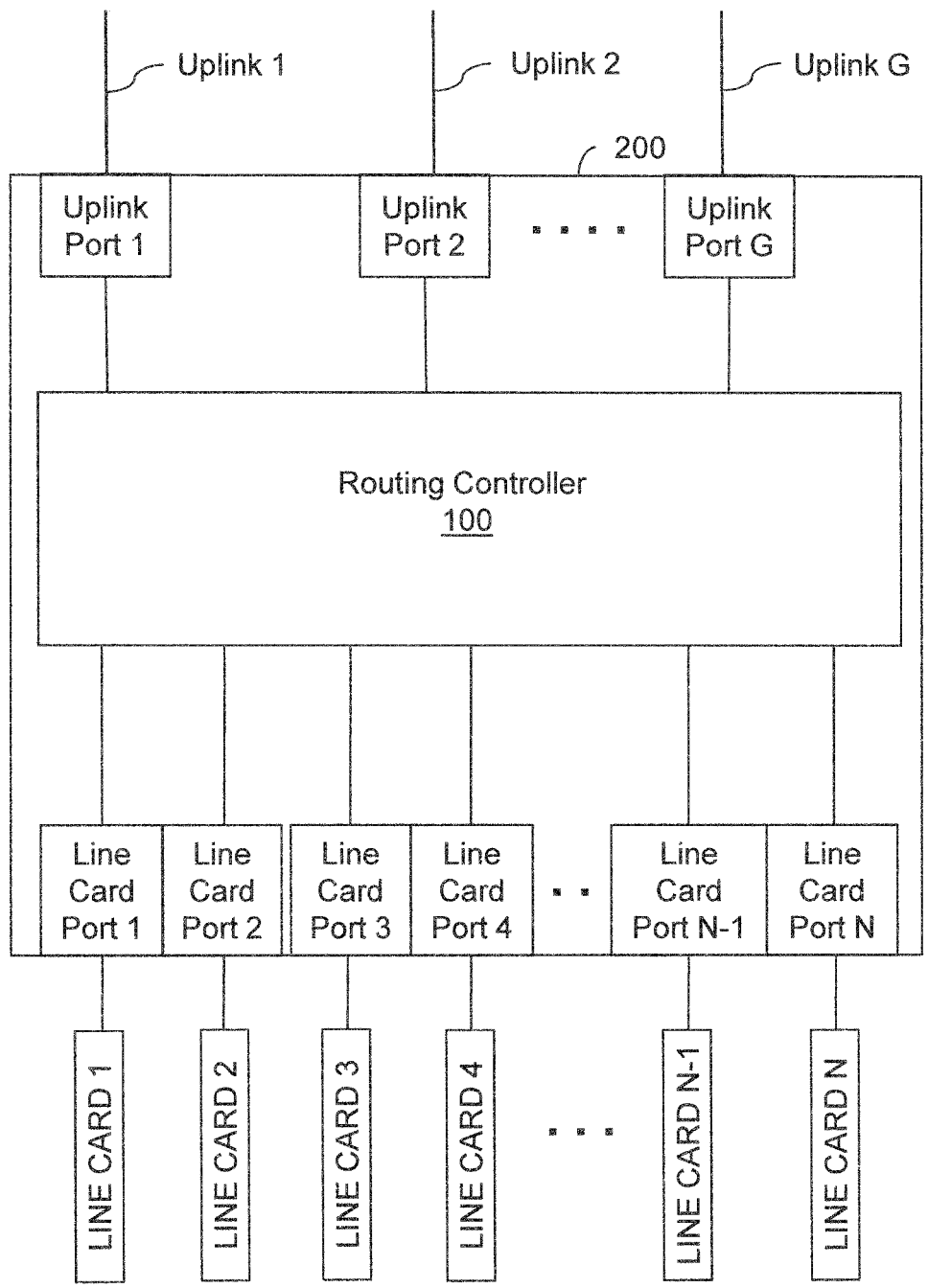
FIG. 2 illustrates an embodiment of a network switch associated with cascaded memory tables for searching.

FIG. 2 illustrates one embodiment of a networking switch 200 implemented with the routing controller 100 of FIG. 1. The network switch 200 is an interface between uplinks 1-G of a network and line cards 1-N. The routing controller 100 assists the network switch with routing network packets by identifying an uplink port 1-G or a line card port 1-N to which the network packet should be routed. In one embodiment, the uplinks 1-G operate at higher data rate than the line cards 1-N. In other embodiments, the data rates can be the same. The line cards 1-N provide an interface between electronic devices and the networking switch 200. The uplinks 1-G are connected to the networking switch 200 at uplink ports 1-G. The line cards are connected to the networking switch 200 at line card ports 1-N.

When the networking switch 200 receives a network packet at an uplink port 1-G and the routing controller 100 routes the network packet to one of the line card ports 1-N that the receiving port is associated with. The routing is performed by searching for and mapping addresses using the data from the memory tables 1-G as discussed above. The network packet is routed based in part on information in a header of the network packet as discussed below. Alternatively, the networking switch 200 may receive a network packet at a line card port 1-N and the routing controller 100 routes the network packet to one of the uplink ports 1-G.

Figure 3:
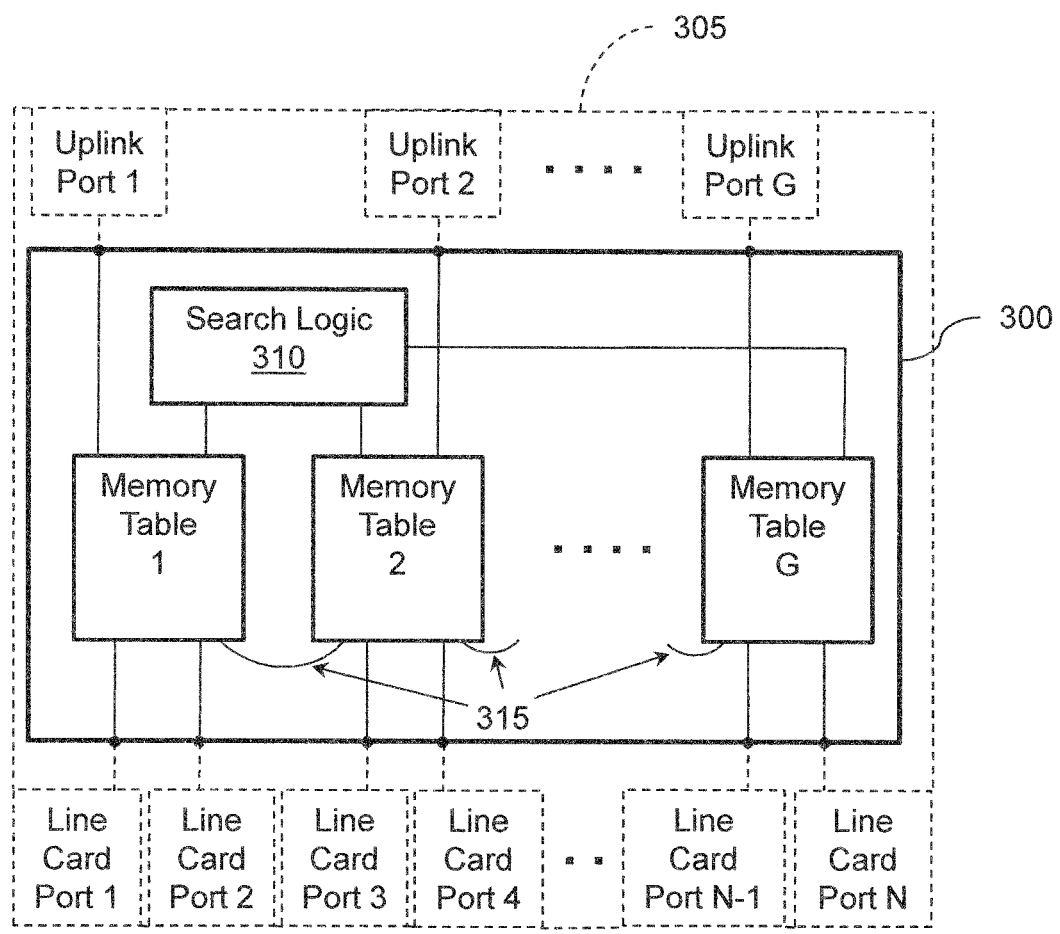
FIG. 3 illustrates an embodiment of an apparatus associated with cascaded memory tables for searching.

FIG. 3 illustrates one embodiment of an apparatus 300 configured with cascaded memory tables 1-G and that searches the memory tables 1-G in a cascading manner. The apparatus 300 can operate similar to the routing controller 100 of FIG. 1. In one embodiment, the apparatus 300 is implemented in a network switch 305 and operates to route packets to a destination. The memory tables 1-G store routing data for routing network packets. The apparatus 300 is configured to use the stored data to determine how to route a network packet, how to filter a network packet, and/or how to police a network packet as discussed below.

When a network packet is received, the network switch 305 identifies a destination address from the network packet and forwards the address to the apparatus 300. Search logic 310 in the apparatus 300 is configured to search for routing information that corresponds to the address in the memory tables 1-G. In one embodiment, the memory tables 1-G are address tables implemented with separate blocks of memory. The memory tables 1-G may be memory arrays implemented with memory cells that store address. In other embodiments, the memory tables 1-G are configured to store addresses, portions of address, event information related to the content of the packet, and/or other information associated with network packets.

The uplink ports 1-G are connected to the memory tables 1-G. One uplink port 1-G may be connected to one of the memory tables 1-G as shown in FIG. 3. In other embodiments, one uplink port 1-G is connected to more than one memory table 1-G and a memory table is connected to no more than one uplink port 1-G.

In one embodiment, different ports connected to the apparatus 300 are associated with different memory tables 1-G. The ports are associated to the memory tables 1-G based, at least in part, on how the ports are connected to the memory tables 1-G. The search logic 310 will initiate a search of a memory table associated with a port when a network packet is received. For example, if a network packet is received at uplink port 1, then the search logic 310 will initiate a search of memory table 1 for information on how to route the network packet. Memory table 1 is chosen for the search because memory table 1 is connected to service routing requests with uplink port 1. In another embodiment, the memory table to be searched first can be determined using a hash function. The hash function determines which memory table 1-G is searched first based, at least in part, on the port number that received the corresponding packet.

In another example, if uplink port 1 were connected to both memory table 1 and 2, then the search logic 310 will initiate a search of the left-most memory table that the uplink port is connected to. Uplink port 1 is associated with memory tables 1 and 2 because uplink port 1 is connected to memory tables 1 and 2. When an uplink port is associated with more than one memory table 1-G, the memory logic 310 may use other suitable algorithms or hash functions to determine where to begin a search.

In an example operation, the network switch 305 is configured to receive multiple packets at multiple uplink ports 1-G or line card ports 1-N in parallel. The search logic 310 is configured to initiate a search of more than one memory table 1-G in parallel. The parallel searches search for different addresses in different memory tables 1-G. The memory tables 1-G are searched in parallel, independent of one another. In one embodiment, the memory tables 1-G are configured to complete a search in one table in one clock cycle.

In one embodiment, when the search does not find the address in an initially searched address table 1-G, the search logic 310 searches a neighboring (serially connected) memory table. The apparatus 300 is configured with electrical connection lines 315 that connect the memory tables 1-G to create a cascaded memory table as previously described. The search logic 310 is configured to initiate a cascaded search to the neighboring memory table through an electrical connection line when the initial search fails to find the address. The search logic 310 effectively interrupts the neighboring memory table to perform the cascaded search. Thus the neighboring memory table is caused to delay processing address searches for its assigned ports and perform a search for an unassigned port. If the address is not found in the neighboring memory table, the search logic 310 will continue the sequential search to the next connected memory tables and so on. The control logic 310 is configured to continue the searching until the address is found or the memory tables 1-G have been searched.

Routing information stored at a memory location in a table is retrieved when the address is found/matched in one of the memory tables 1-G. In one embodiment, the routing information indicates a port that the network packet is to be routed to by the apparatus 300. The routing information may be a destination address and the apparatus 300 routes data based, at least in part, on the destination address.

The apparatus 300 can collect and store predetermined routing information in the memory tables 1-G. The apparatus 300 can also use a suitable routing table algorithm to determine routing information. Those of ordinary skill in the art will appreciate that the network switch 305 may acquire routing information about network addresses in variety of ways and provide this information to the apparatus 300. The routing information is stored in the memory tables 1-G for later retrieval when packets are processes for routing. In another embodiment, the network switch 305 monitors network traffic and periodically updates routing information in the memory tables 1-G based in part on new routing data collected.

With continued reference to FIG. 3, the line card ports 1-N of the network switch 305 are operatively connected to the memory tables 1-G in selected assignments. For example, line card ports 1 and 2 are connected to memory table 1, line card ports 3 and 4 are connected to memory table 3, and line card ports N−1 and N are connected to memory table G. Although two line card ports are shown associated with a single memory table, different numbers of assignments can be implemented.

The line card ports 1-N are interfaces to line cards. A line card is a device for interfacing electronic device access lines with switches, routers and/or other network devices. Digital and analog line cards operate at various speeds. Line cards may be connected to electric cables or optical fibers. Digital line cards for data networks forward packets, provide ping responses, and provide packet fragmentation features. The line cards also perform queuing of data, congestion control, Committed Access Rate (CAR) functions, and/or statistics of data flow.

In another embodiment, the memory tables 1-G are independently configured to store network parameters. For example, the network parameter may be a filter parameter.

The apparatus 300 is configured to filter network packets based, at least in part, on the filter parameter. In one example, the apparatus 300 will filter network packets to prevent unauthorized access to a network. Filtering allows authorized users or packets with an IP address that appears in one of the memory tables 1-G to have network packets forwarded by the apparatus 300. Unauthorized network packets are dropped. Network packets can be filtered, based at least in part, on a portion of the IP address.

In another embodiment, the apparatus 300 is configured to police network packets. Network packets are policed by rate limiting the network packets. For example, the control logic 310 searches the memory tables 1-G for the address of a network packet as discussed previously. When the address is found, a rate limiting field associated with the address indicates a maximum data transfer rate. The apparatus 300 is configured to then route the network packet to a port where logic associated with that port will transmit the network packet below the maximum data transfer rate.

In another embodiment, the apparatus 300 implements a search register that stores a cascade bit. When the cascade bit is set, the search logic 310 is permitted to forward a search to the next connected memory table until a matching network parameter is found. When the cascade bit is not set, cascading searches is not enabled. In one embodiment, the cascade bit is firmware programmable.

Figure 4:
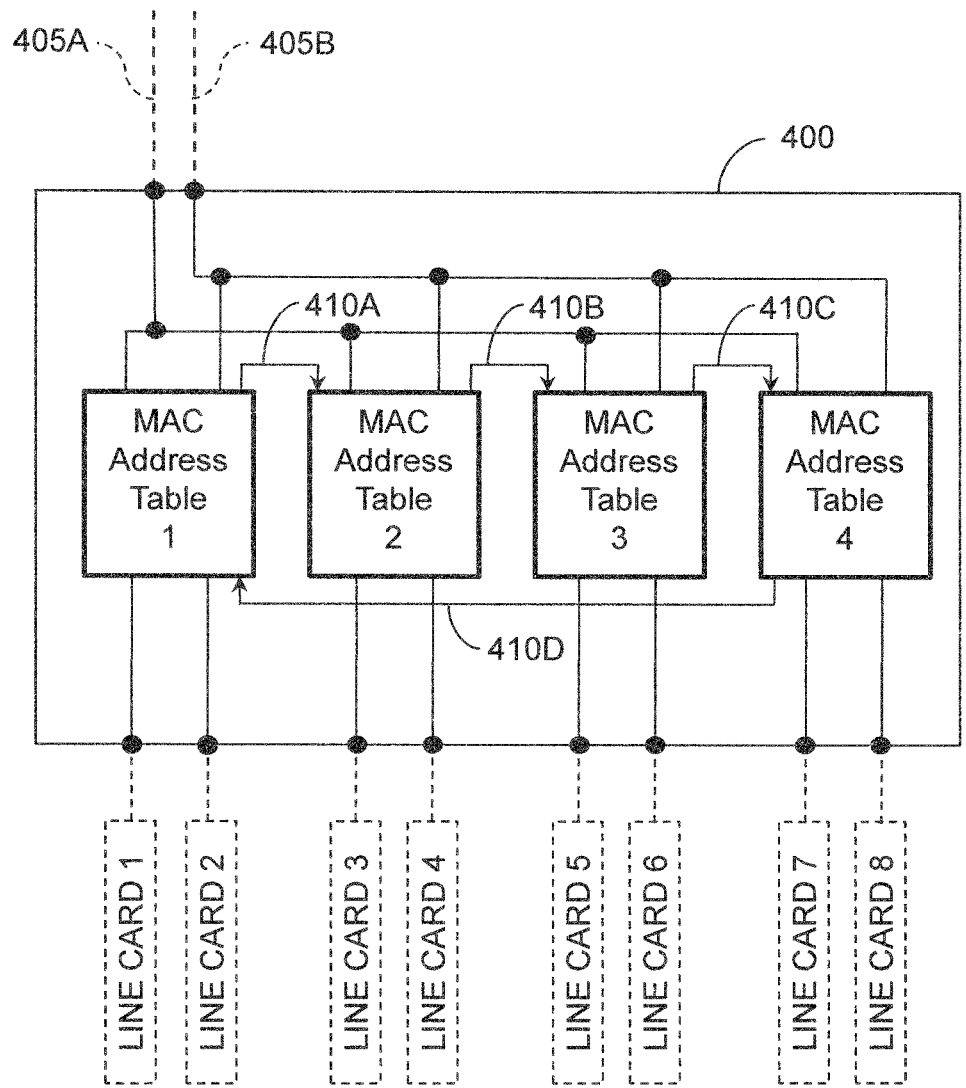
FIG. 4 illustrates another embodiment of an apparatus associated with cascaded memory tables for searching.

FIG. 4 illustrates one embodiment of an apparatus 400 configured with media access control (MAC) address tables (e.g. tables 1-4). The MAC tables are operated and searched in a cascading manner as previously described memory tables (see FIG. 1). The apparatus 400 operates similar to the routing controller 100 of FIG. 1 and/or apparatus 300 of FIG. 3. In one embodiment, the apparatus 400 can be implemented in a networking switch that provides an interface between network connections (e.g. uplinks 405A-B and line cards 1-8). The network uplinks 405A-B and line cards 1-8 are electrically connected to the apparatus 400 as shown. Different numbers of network uplinks 405A-B and line cards 1-8 may be electrically connected to the MAC address tables 1-4 than what is shown in FIG. 4. For example, four line cards may be connected to one of the MAC address tables 1-4 and one uplink 405A-B may be connected to one of the MAC address tables 1-4.

When the apparatus 400 receives a network packet, the apparatus 400 will determine a destination address that is a MAC address of the network packet. The apparatus 400 will initiate a search for the MAC address in one of the MAC address tables 1-4 similar to how the search logic 310 of FIG. 3 initiated a search. If the MAC address is not found, search logic (discussed below in reference to FIG. 5) implemented in the MAC address tables 1-4 will initiate a search of an adjacent MAC address table through electrical connection lines 410A-D as previously explained. The connection lines 410A-D serially connect MAC address tables 1-4. In one embodiment, the electrical connection lines 410A-D electrically connect the MAC address tables 1-4 in a ring topology. Upon finding the MAC address, the network packet is routed based, at least in part, on corresponding routing data retrieved from the MAC address table 1-4 where the MAC address is found.

Figure 5:
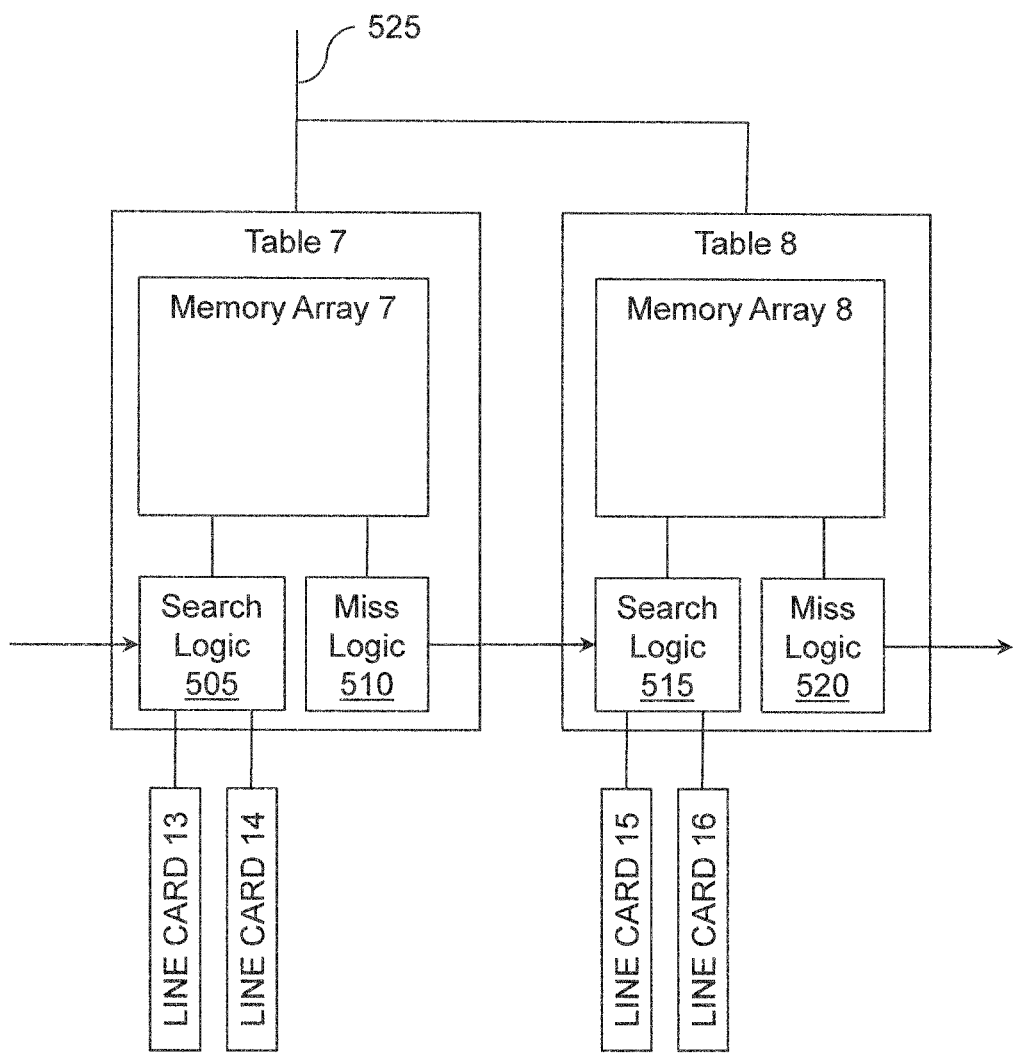
FIG. 5 illustrates another embodiment of an apparatus associated with cascaded memory tables for searching.

FIG. 5 illustrates one embodiment of memory tables (e.g. tables 7 and 8) implemented with distributed search logic. Tables 7-8 represent two tables of a routing system that is comprised of multiple memory tables (e.g. memory tables 1-G of FIG. 1). The distributed search logic is implemented with search logic 505, 515 and miss logic 510, 520. The two tables 7-8 include memory arrays that store addresses and/or other information associated with routing network packets. The memory arrays may be content addressable memory (CAM) that is searchable based, at least in part, on an address. If a memory table is searched and no matching entries are found, then the miss logic 510, 520 generate a signal or value indicating no match was found.

In operation, the search logic 505 of table 7 receives an address to be searched from line card 13, line card 14, or uplink port 525. The search logic 505 will then initiate a search of memory array 7 for the address. In parallel, search logic 515 may receive a search request from line card 15, line card 16, or uplink port 525. Search logic 515 is configured to initiate a search of memory array 8. In the table 7, if search logic 505 fails to find the address in memory array 7, the miss logic 510 generates a miss signal and the search is cascaded to table 8. The miss signal is inputted to search logic 515 of table 8 via a connection line. In one embodiment, the miss signal acts as an interrupt that delays or prevents further searches for addresses received from line card 15 or line card 16. The search logic 515 then initiates a search in memory array 8 for the address from table 7. If the address is not found, the miss logic 520 of table 8 signals the next serially connected table to continue the search in the serially connected tables. This process will repeat until the address is found or until no serially connected table finds the address.

Figure 6:
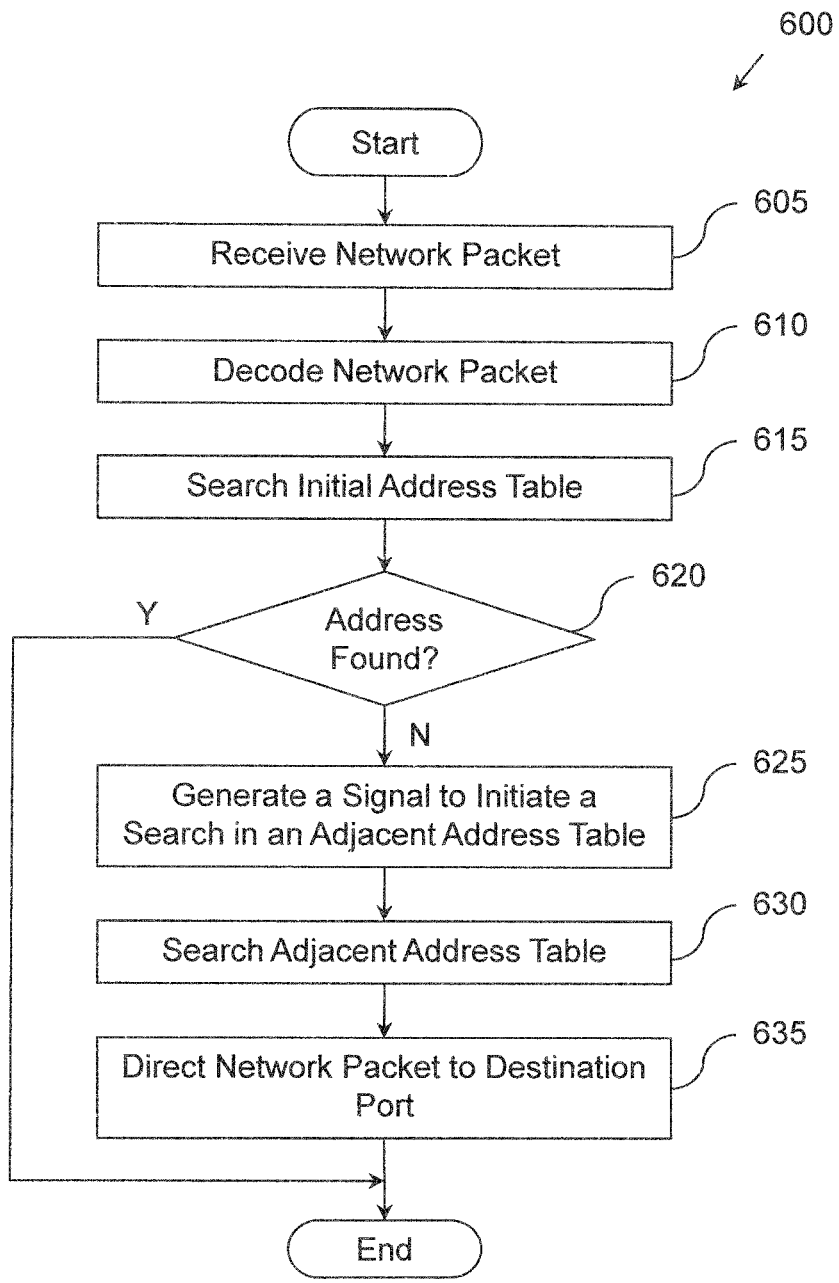
FIG. 6 illustrates one embodiment of a method associated with cascaded memory tables for searching.

FIG. 6 illustrates an embodiment of a method 600 associated with searching memory cells in a cascading sequence. The method will be described using a memory table structure similar to that shown in FIG. 1. The method 600 improves the routing of network data by providing for the cascaded searching of address tables to find routing information. Networking equipment can then route a packet, based at least in part, on the routing information.

The method 600 is initiated when a network packet is received (at 605). The packet is then decoded (at 610). The network packet is decoded to determine a destination address that the packet is to be routed to. An initial address table is searched, at 615, for an address matching the destination address. The initial address table may be a content addressable memory (CAM) or another memory that is suitable to be searched for the destination address.

A determination is made to determine if a matching address is found, at 620. If the matching address is found in the initial table, then stored routing information is read and the packet is routed accordingly. The method 600 ends after the packet is routed. If the matching address is not found in the initial table, a signal to initiate a search in the next address table is generated at 625. The next address table is one that is serially connected to the initial address table. The serially connected address table is searched, at 630, for an address matching the destination address.

In this manner, the method 600 can forward a search across a serial address table connection so that searches of multiple address tables are performed as if multiple address tables are a single homogenous database.

If the destination address is found in the next address table, then the network packet is directed, at 635, to a destination port corresponding to the destination address. The destination port is determined, at least in part, as discussed above by retrieving routing information stored at an address table entry where the destination address was found. If the destination address is not found in the next table, then the method 600 will continue to search another next address table until the address is found or the tables have been searched. In one embodiment, if the address has not been found in the tables after the tables are searched, then flood messages may be sent to multiple destination ports in an effort to try to successfully forward the network packet.

In another embodiment, state machines may control the searching of corresponding address tables. A search may begin at any one of the multiple address tables and the start and end address tables can be unknown. Therefore, the state machine associated with a particular address table will check to see if the search of its address table is the last search of the serially connected address tables. The last state machine of a last address table may take additional actions than a state machine of an address table that is not the last searched address table.

Figure 7:
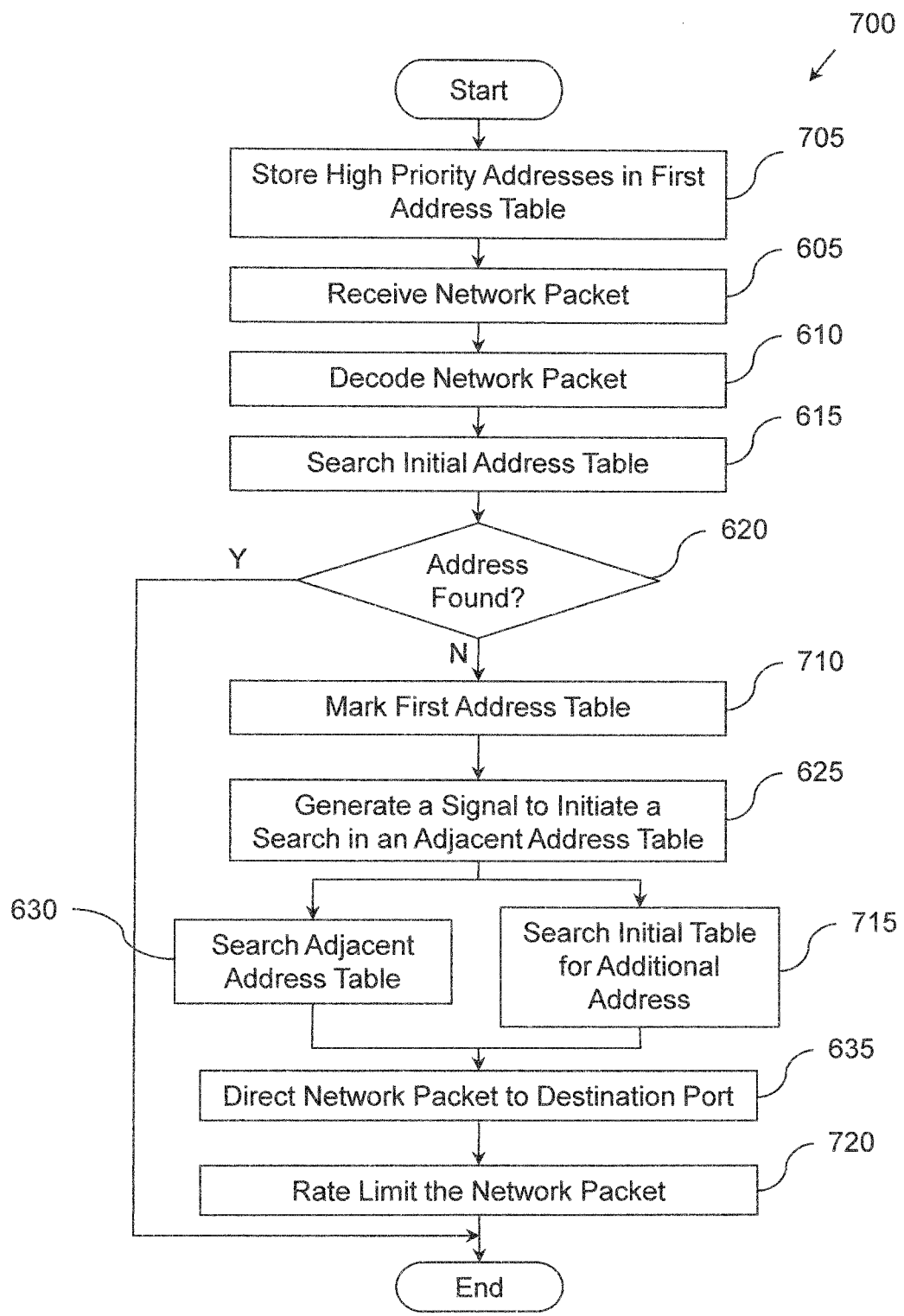
FIG. 7 illustrates another embodiment of a method associated with cascaded memory tables for searching.

FIG. 7 illustrates another embodiment of a method 700 associated with searching cascaded memory cells. The method 700 improves the ability of a network switch to route network data by providing for the cascaded searching of address tables to find routing information. The network switch can then use the routing information to route network packets. If a source address is found in one address table, this event can be marked so that other address tables do not try to learn the same information.

The method 700 stores, at 705, high priority addresses in a high priority address table. When the method 700 detects a high priority address, the high priority address table is the first table searched so that the address is found. The high priority address table is one address table that is serially connected to another address table in a cascading chain of individual tables as previously explained. The "first" address table used here is the first address table in the chain of address tables.

FIG. 7 includes the some of same actions as FIG. 6 and the corresponding blocks are labeled with the same reference numbers (e.g. 605-635). The descriptions of these actions are not repeated for purposes of brevity. If the address is not found (at 620), the address table where the address is not found is marked (at 710). The address table is marked so that the address table is not searched again for the same address. After the address is found or later resolved, the marked address table is unmarked.

After the table is marked, a signal is generated to initiate the search in an adjacent address table, at 625, similar to method 600 that is discussed above. The adjacent address table is serially connected to the initial address table. Method 700 differs from method 600 in that parallel searches are performed. For example, while the adjacent address table is searched, at 630, a new and different search is performed in parallel, at 715, within the initial address table for a different address.

If the destination address is found after the adjacent address table search, then the network packet is directed, at 635, to a destination port as in method 600 of FIG. 6. If the destination address is not found, then other address tables are searched in series until the address is found or the address tables have been searched.

In one embodiment, when the address is found, the network packet is rate limited at 720. The network packet is rate limited, at 720, by transferring data associated with the network packet at a reduced rate. The network packet is rated limited based, at least in part, on rate limiting information associated with the matched address that was found in an address table. The rate limiting information is read from the address table and the network packet is rate limited according to the rate limiting information. For example, the network packet is rate limited by sending the network packet to a rate limited port corresponding to the rate limiting information. The packet will be transmitted by logic associated with a rate limited port below a rate specified by the rate limiting information.

In another embodiment, the method 700 is performed by a networking switch (e.g. switch 200 shown in FIG. 2).

It will be appreciated that in one embodiment, the methods described herein or their equivalents may be implemented as computer executable instructions embodied and stored on a computer-readable medium. When executed by a machine (e.g., processor, device) the instructions cause the machine to perform the method. In other embodiments, the methods are implemented to be performed by a semiconductor memory chip. The methods can also be implemented with circuits. In one embodiment, the methods are implemented in a networking switch that processes data according to a Gigabit Passive Optical Networking (GPON) standard.

Figure 8:
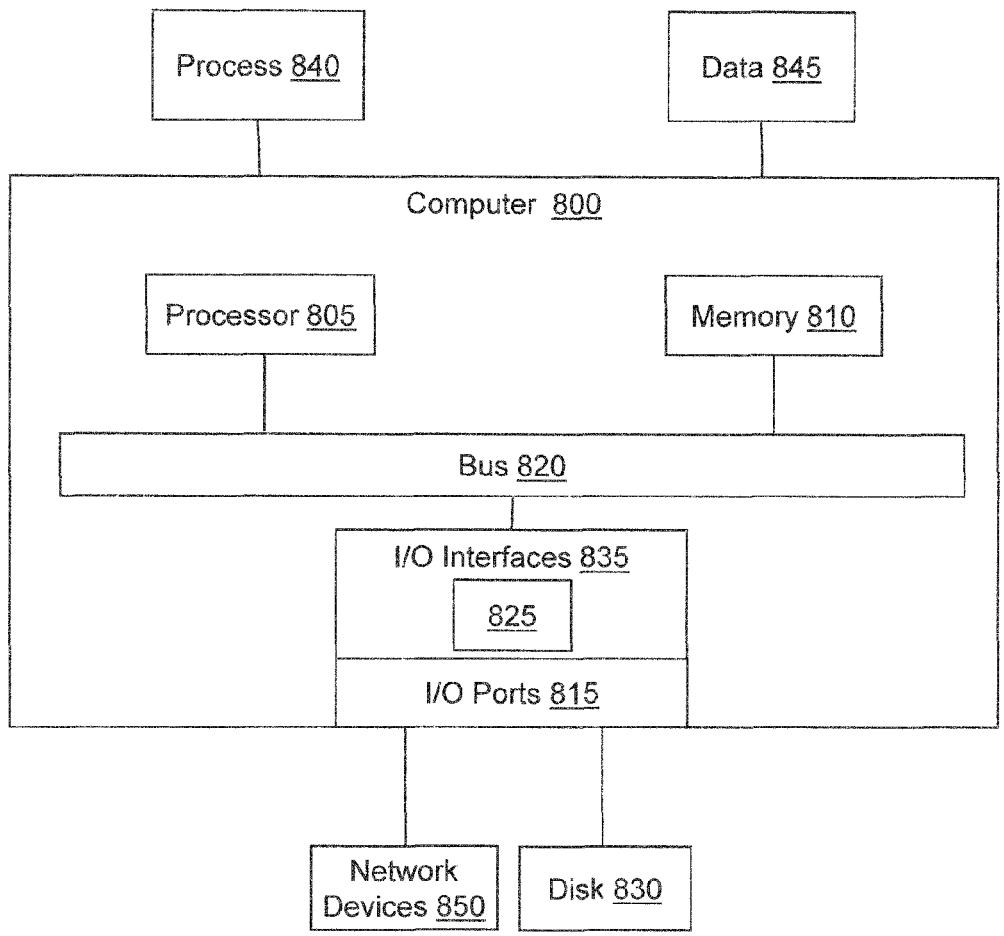
FIG. 8 illustrates an embodiment of a computing environment in which example systems and methods, and equivalents associated with cascaded memory tables may operate.

FIG. 8 illustrates one embodiment of an example computer 800 in which example systems and methods described herein, or equivalents, are implemented. The example computer 800 comprises a processor 805, a memory 810, and input/output ports 815 operably connected by a bus 820. In one example, the computer 800 memory table access logic 825 configured to cascade memory tables and to search the cascaded memory tables.

The memory access logic 825 provides means (e.g., hardware, stored software, and firmware) to cascade memory tables and to search the cascaded memory tables. The memory access logic 825 can be implemented similar to the route controller 100 of FIG. 1 and/or apparatuses 300 and 400 of FIGS. 3 and 4 and/or combinations of their features. The memory access logic 825 can include logic implemented, for example, as an ASIC or other type of circuit.

Generally describing an example configuration of the computer 800, the processor 805 may be a variety of various processors including dual microprocessor and other multiprocessor architectures. A memory 810 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 830 may be operably connected to the computer 800 via, for example, through an input/output interface (e.g., card, device) 835 and the input/output port 815. The disk 830 may be, for example, a magnetic disk drive, a solid state disk drive, a floppy disk drive, a tape drive, a Zip drive, a flash memory card, a memory stick, and so on. Furthermore, the disk 830 may be a compact disk read-only memory (CD-ROM) drive, a compact disk recordable (CD-R) drive, a compact disk rewritable (CD-RW) drive, a digital video disk read-only memory (DVD ROM), and so on. The memory 810 can store a process 840 and/or a data 845, for example. The disk 830 and/or the memory 810 can store an operating system that controls and allocates resources of the computer 800.

The bus 820 may be a single internal bus interconnect architecture and/or other bus or mesh architectures. While a single bus is illustrated, it is appreciated that the computer 800 may communicate with various devices, logics, and peripherals using other busses (e.g., peripheral component interconnect express (PCIE), 1394, universal serial bus (USB), Ethernet). The bus 820 can be types including, for example, a memory bus, a memory controller, a peripheral bus, an external bus, a crossbar switch, and/or a local bus.

The computer 800 may interact with input/output devices via the input/output (I/O) interfaces 835 including the memory access logic 825 and the input/output ports 815. Input/output devices may be, for example, a keyboard, a microphone, a pointing and selection device, cameras, video cards, displays, the disk 830, the network devices 850, and so on. The input/output ports 815 may include, for example, serial ports, parallel ports, and USB ports.

The computer 800 can operate in a network environment and thus may be connected to the network devices 850 via the I/O interfaces 835, and/or the I/O ports 815. Through the network devices 850, the computer 800 may interact with a network. Through the network, the computer 800 may be logically connected to remote computers. Networks with which the computer 800 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An integrated chip, comprising:
    two or more address tables implemented with separate memory tables configured to store addresses and network routing information, where the two or more address tables are comprised of a first address table stored in a first memory table and a second address table stored in a second memory table;
    connection lines connecting the first address table and the second address table to create a cascaded address table; and
    search logic to initiate a search of the first address table for a destination address received from a network packet, wherein if the destination address is not found, the search logic is configured to initiate a search of the second address table through the connection lines, and when the destination address is found at a memory location in the second memory table, causing the network packet to be routed based on the network routing information stored at the memory location.

2. The integrated chip of claim 1, wherein the connection lines further electrically connect the two or more address tables serially in a ring topology, wherein the search logic is configured to begin a search for an address at a selected address table of the two or more address tables and, if the address is not found, to continue the search to an adjacently connected address table of the two or more address tables via the connection lines.

3. The integrated chip of claim 1, wherein the integrated chip is configured to operate in a networking switch, wherein the networking switch is configured to receive the network packet from an uplink port.

4. The integrated chip of claim 1, wherein the first address table is associated with a first plurality of line cards and the second address table is associated with a second plurality of line cards, wherein the integrated chip is configured to determine a packet address corresponding to a network packet received from the uplink port, wherein the search logic is configured to initiate the search based, at least in part, on the packet address, and wherein the network packet is routed to one of the first plurality of line cards or one of the second plurality of line cards based, at least in part, on the address found by the search logic.

5. The integrated chip of claim 1, wherein the search logic searches the two or more address tables independently, and wherein the two or more address tables store one or more of: media access control (MAC) addresses, layer two addresses, Internet Protocol (IP) addresses, and layer three addresses.

6. The integrated chip of claim 1, wherein the search logic and the connection lines are configurable to perform different searches in the first address table and the second address table in parallel.

7. The integrated chip of claim 1, wherein the integrated chip is implemented in the network switch for connection with a network, the network switch is configured to pass the search to another device connected to the network when the address is not found in the cascaded address table.

8. A semiconductor chip, comprising:
    memory blocks configured as three or more tables that independently store network parameters including routing information, wherein the three or more tables are connected via at least one connection line in series to form a cascaded parameter table in a ring topology; and
    search logic configured to receive a network parameter associated with a network packet and to begin searching in any one of the three or more tables sequentially in series until a matching parameter is found, wherein when the network parameter is found at a memory location in the three or more tables, the search is terminated and the network packet is routed based on the routing information stored at the memory location;
    wherein the semiconductor chip is configured to operate in a networking switch.

9. The semiconductor chip of claim 8, further comprising a search register that stores a cascade bit, wherein when the cascade bit is set, the search logic is configured to search the cascaded parameter table until the matching network parameter is found, and when the cascade bit of the search register is not set, the search logic controls the three or more tables so that one of the three or more tables is searched.

10. The semiconductor chip of claim 9, wherein the cascade bit is firmware programmable.

11. The semiconductor chip of claim 8, further comprising connection ports, wherein one connection port is for connection to an uplink port of a plurality of uplinks, wherein the network parameter is received from one of the plurality of uplinks, wherein the search logic is configured to selectively initiate a search of the cascaded parameter table at one of the three or more tables associated with an uplink from which the network parameter was received.

12. The semiconductor chip of claim 8, wherein the semiconductor chip is configured to receive from the uplink port a network packet with a network parameter that is an address, wherein the search logic is configured to search the three or more tables, based at least in part, on the address to find a destination line card port associated with the plurality of line card ports, wherein the semiconductor chip routes the network packet to the destination line card port.

13. The semiconductor chip of claim 8, further comprising an uplink port for receiving network packets, wherein the network parameter is a filter parameter, and wherein the semiconductor chip is configured to filter network packets based, at least in part, on the filter parameter.

14. A method, comprising:
decoding a network packet to determine a destination address;
initiating a search for an address matching the destination address in any one of three or more address tables connected via connection lines in series in a ring topology, wherein the search begins in a first address table and ends if the matching address is found;
if the matching address is not found:
- generating a signal to initiate a search in a second address table that is serially connected to the first address table in the ring topology;
- searching the serially connected second address table for an address matching the destination address; and
- if the matching address is found, transmitting the network packet to a destination port corresponding to the destination address;

wherein the method operates in a networking switch.

15. The method of claim 14, wherein the network packet is received from an uplink port.

16. The method of claim 14, further comprising:
rate limiting the network packet by transferring data associated with the network packet at a reduced rate, wherein the network packet is rate limited based, at least in part, on rate limiting information associated with the matched address, wherein the network packet is rate limited by sending the network packet to a rate limited port corresponding to the rate limiting information.

17. The method of claim 14, further comprising:
searching the first address table for an additional address matching an additional destination address in parallel to searching the serially connected second address table for an address matching the destination address.

18. The method of claim 14, further comprising:
storing high priority addresses in the first address table so that the high priority addresses are found on a first address table search.

19. The method of claim 14, further comprising:
marking the first address table with a mark when the address is not found in the first address table so that the first address table is not searched again for the address.

20. The method of claim 14, further comprising:
transmitting the destination address to another device connected to the network when the matching address is not found in the ring topology.

* * * * *